(12) United States Patent
North

(10) Patent No.: US 7,524,082 B2
(45) Date of Patent: Apr. 28, 2009

(54) NETWORKING CABLE WITH LIGHTING SYSTEM FOR CABLE TRACING

(76) Inventor: Todd Michael North, 21965 N. Gibson Dr., Maricopa, AZ (US) 85239

( * ) Notice: Subject to any disclaimer, the term of this patent is extended or adjusted under 35 U.S.C. 154(b) by 170 days.

(21) Appl. No.: 11/675,798

(22) Filed: Feb. 16, 2007

(65) Prior Publication Data

US 2008/0198618 A1 Aug. 21, 2008

(51) Int. Cl.
*F21S 4/00* (2006.01)
(52) U.S. Cl. .................. 362/219; 362/391; 362/551
(58) Field of Classification Search .............. 362/222, 362/219, 391, 551
See application file for complete search history.

(56) References Cited

U.S. PATENT DOCUMENTS

| | | | |
|---|---|---|---|
| 3,349,196 A | 10/1967 | Anderson | |
| 4,471,293 A | 9/1984 | Schnack | |
| 4,524,320 A | 6/1985 | Brooks | |
| 4,575,588 A | 3/1986 | Vande Vyver | |
| 4,769,596 A | 9/1988 | Faucett | |
| 4,933,962 A | 6/1990 | Sanders | |
| 5,141,449 A * | 8/1992 | Tieszen | 439/419 |
| 5,285,163 A | 2/1994 | Liotta | |
| 5,414,343 A | 5/1995 | Flaherty et al. | |
| 5,463,706 A | 10/1995 | Dumont et al. | |
| 5,601,448 A * | 2/1997 | Poon | 439/419 |
| 5,649,111 A | 7/1997 | Rehquate et al. | |
| 5,666,453 A | 9/1997 | Dannenmann | |
| 5,764,043 A | 6/1998 | Czosnowski et al. | |
| 5,831,436 A | 11/1998 | Borland | |
| 5,876,863 A * | 3/1999 | Feldman et al. | 428/690 |
| 6,017,241 A * | 1/2000 | Komai | 439/419 |
| 6,356,084 B1 | 3/2002 | Levine | |
| 6,437,580 B1 | 8/2002 | Gale | |
| 6,577,243 B1 | 6/2003 | Dannenmann et al. | |
| 6,710,254 B2 * | 3/2004 | Yueh | 174/135 |
| 6,851,818 B2 * | 2/2005 | Sharon et al. | 362/84 |
| 6,957,001 B2 * | 10/2005 | He | 385/104 |
| 6,973,517 B1 | 12/2005 | Golden et al. | |
| 6,975,242 B2 | 12/2005 | Dannenmann et al. | |
| 7,029,137 B2 * | 4/2006 | Lionetti et al. | 362/84 |
| 7,049,937 B1 | 5/2006 | Zweig et al. | |
| 7,075,283 B1 | 7/2006 | Lo et al. | |
| 7,399,105 B2 * | 7/2008 | Southard et al. | 362/391 |
| 2003/0222786 A1 | 12/2003 | Dannenmann et al. | |
| 2004/0149998 A1 | 8/2004 | Henson et al. | |
| 2006/0057876 A1 | 3/2006 | Dannenmann et al. | |
| 2006/0061369 A1 | 3/2006 | Marks et al. | |
| 2006/0232385 A1 | 10/2006 | Scherer et al. | |
| 2006/0243105 A1 * | 11/2006 | Delfini et al. | 81/488 |
| 2007/0153508 A1 * | 7/2007 | Nall et al. | 362/219 |
| 2007/0211464 A1 * | 9/2007 | Tao | 362/252 |
| 2008/0115957 A1 * | 5/2008 | Duffy et al. | 174/112 |

\* cited by examiner

*Primary Examiner*—Jong-Suk (James) Lee
*Assistant Examiner*—Leah S Lovell
(74) *Attorney, Agent, or Firm*—Schmeiser, Olsen & Watts

(57) ABSTRACT

A cable includes a waveguide with a lighting system removeably attached to it. The lighting system includes a plurality of light emitters extending along the waveguide and connected together with conductive lines. The lighting system also includes light emitter connectors which can be engaged with a power source to activate the light emitters. The activation of the light emitters is useful in cable tracing because it indicates where the waveguide extends.

20 Claims, 8 Drawing Sheets

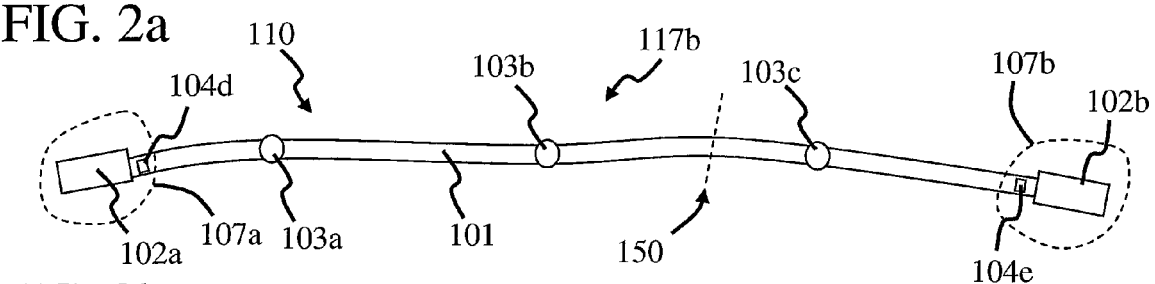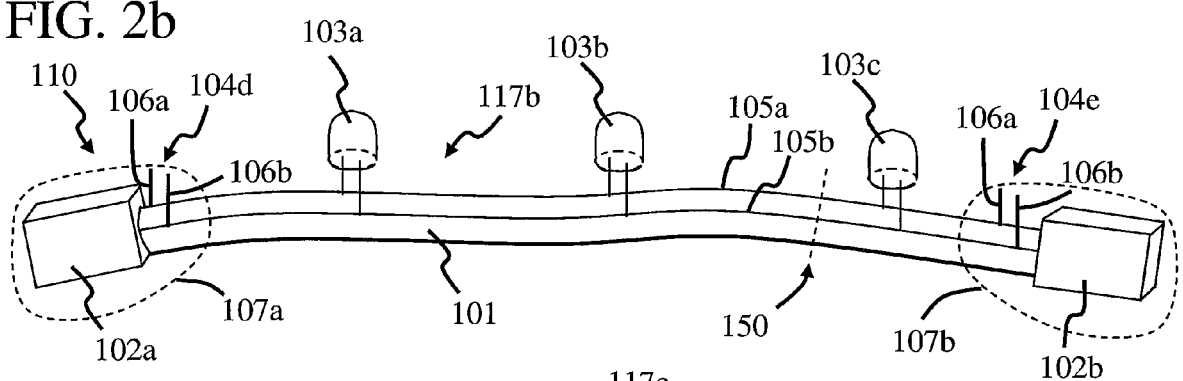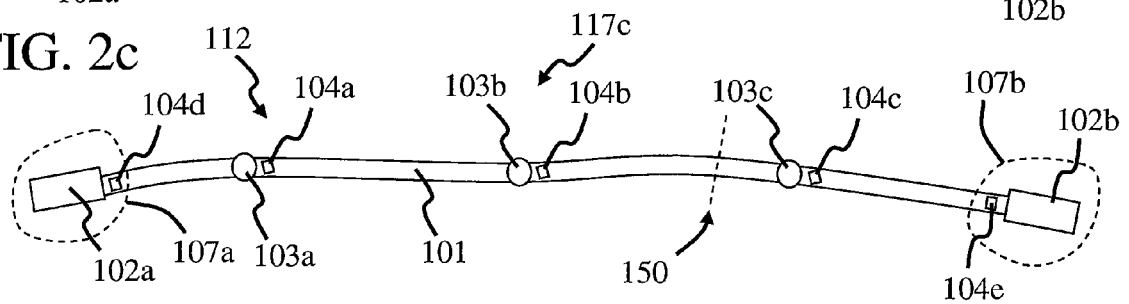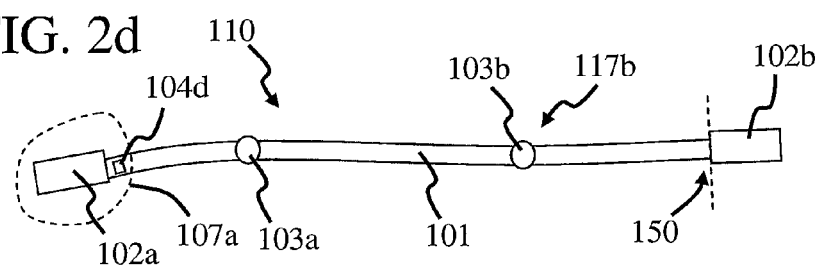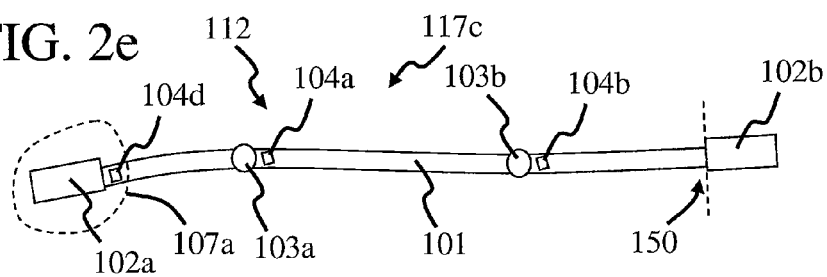

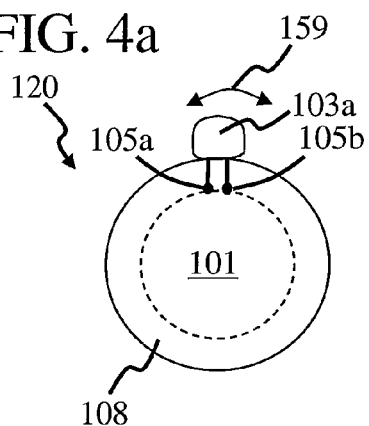
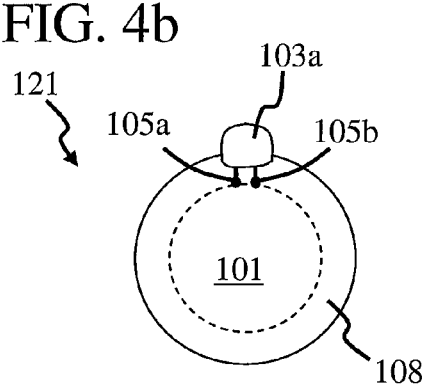
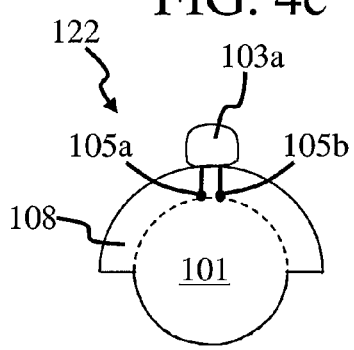
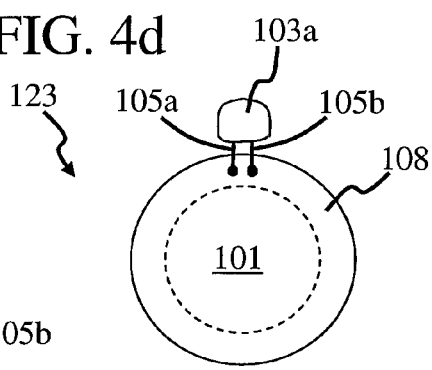
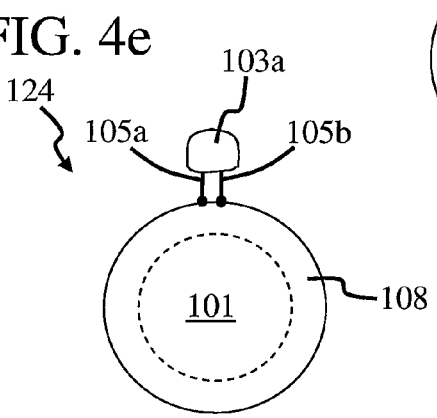
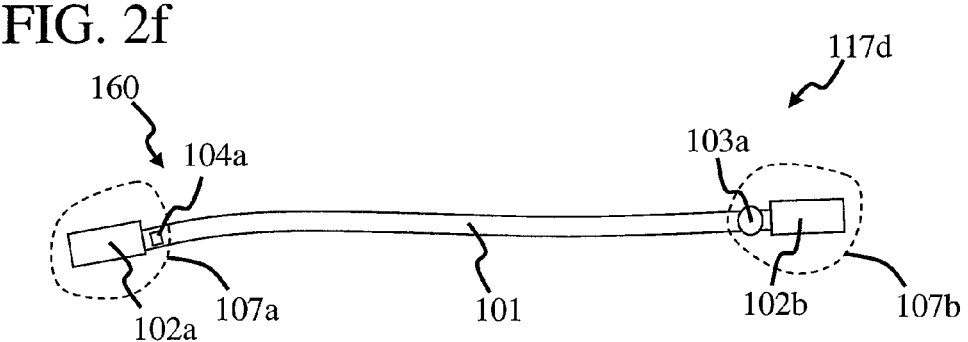

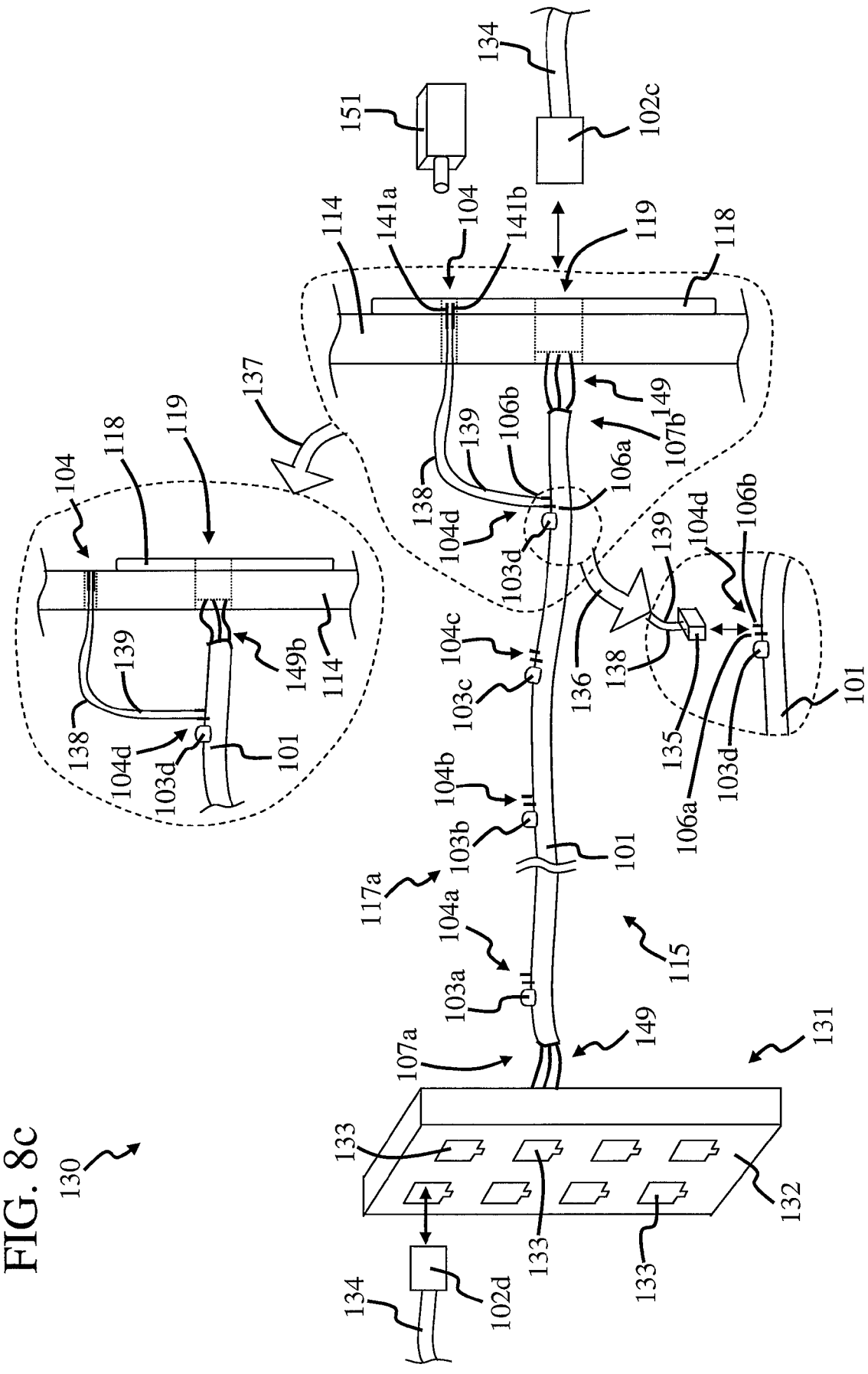

NETWORKING CABLE WITH LIGHTING SYSTEM FOR CABLE TRACING

BACKGROUND OF THE INVENTION

1. Field of the Invention

This invention relates generally to cables for transferring data.

2. Description of the Related Art

Most computer networks include computers in communication with each other through networking cables. The cables can be of many different types, such as coaxial and Ethernet cables, and generally include a waveguide with cable connectors at opposed ends. In a typical setup, a large number of networking cables are grouped together in a bundle and extend for long distances through a building so that the opposing cable connectors are away from each other. The networking cables often extend in such a way that it is difficult to identify which cable connectors belong to which waveguide. The identifying of cable connectors is often referred to as cable tracing.

There are several methods used in cable tracing. One method involves flowing an electrical test signal with a toner through a cable connector at one end of the bundle and detecting it with a sound sensor connected to a cable connector at the opposed end of the bundle. The sound sensor receives the electrical test signal and converts it to a corresponding sound signal when the toner and sound sensor are connected to opposed cable connectors of the same waveguide. However, a person generally uses trial and error by connecting the sound sensor to the different cable connectors at the opposed end of the bundle until the sound signal is detected. This method of cable tracing is tedious and time consuming, and sometimes the electrical test signal is not strong enough to cause the sound sensor to emit sound.

Another method of cable tracing involves including light emitters with the cable connectors at the opposed ends of the waveguide. Light emitter connectors are also positioned at the opposed ends of the waveguide and operatively coupled with the light emitters. Cables that include light emitters are disclosed in U.S. Pat. Nos. 6,975,242 and 6,577,243 by Dannenmann et al. When a potential difference is provided to a light emitter connector, the light emitters operatively coupled therewith emit light to indicate which cable connectors are attached to the same waveguide. However, the light emitters are positioned at the cable connectors, which makes it difficult to identify the corresponding waveguide in between. Further, since the light emitters are positioned at the cable connectors, it is also difficult to reduce the length of the waveguide without removing a light emitter. Removing a light emitter in the cables disclosed by Dannenmann reduces the ability to trace the cable.

BRIEF SUMMARY OF THE INVENTION

The present invention employs a cable which includes cable connectors at opposed ends of a waveguide, wherein the waveguide carries a lighting system. In one embodiment, the lighting system includes three or more light emitters, wherein the light emitters are connected together with conductive lines. A potential difference between the conductive lines activates the light emitters so the cable can be traced. The light emitters are spaced apart from each other along the length of the waveguide so the cable length can be reduced while still retaining the cable tracing benefits provided by them. In another embodiment, the lighting system includes a support structure which carries a plurality of light emitters. The support structure is repeatably removable from the waveguide so that an existing waveguide can be modified by attaching the support structure to it.

These and other features, aspects, and advantages of the present invention will become better understood with reference to the following drawings and description.

BRIEF DESCRIPTION OF THE DRAWINGS

FIG. 1b is a more detailed top view of the networking cable of FIG. 1a.

FIG. 1c is a perspective view of the networking cable of FIG. 1a.

FIGS. 2a and 2b are top and perspective views, respectively, of a networking cable, in accordance with the invention, having a lighting system with light emitter connectors at opposed ends.

FIG. 2c is a side view of a networking cable, in accordance with the invention, having a lighting system with light emitter connectors at opposed ends and along its length.

FIGS. 2d and 2e are top views of the cables of FIGS. 2a and 2c, respectively, with their lengths reduced.

FIG. 2f is a top view of a networking cable, in accordance with the invention, which includes a light emitter connector and light emitter at opposed ends.

FIG. 4a is an end view of the cable of FIG. 3a taken along a cut-line 4a-4a.

FIG. 4b is an end view of the cable of FIG. 3b taken along a cut-line 4b-4b.

FIG. 4c is an end view of the cable of FIG. 3c taken along a cut-line 4c-4c.

FIG. 4d is an end view of the cable of FIG. 4a taken along cut-line 4a-4a, wherein the conductive lines extend through the support structure.

FIG. 4e is an end view of the cable of FIG. 4a taken along cut-line 4a-4a, wherein the conductive lines extend on the outer periphery of the support structure.

FIG. 6a is an end view of the cable of FIG. 5a taken along a cut-line 6a-6a.

FIG. 8c is a side view of the connection system of FIGS. 8a and 8b.

DETAILED DESCRIPTION OF THE INVENTION

Figure 1A:
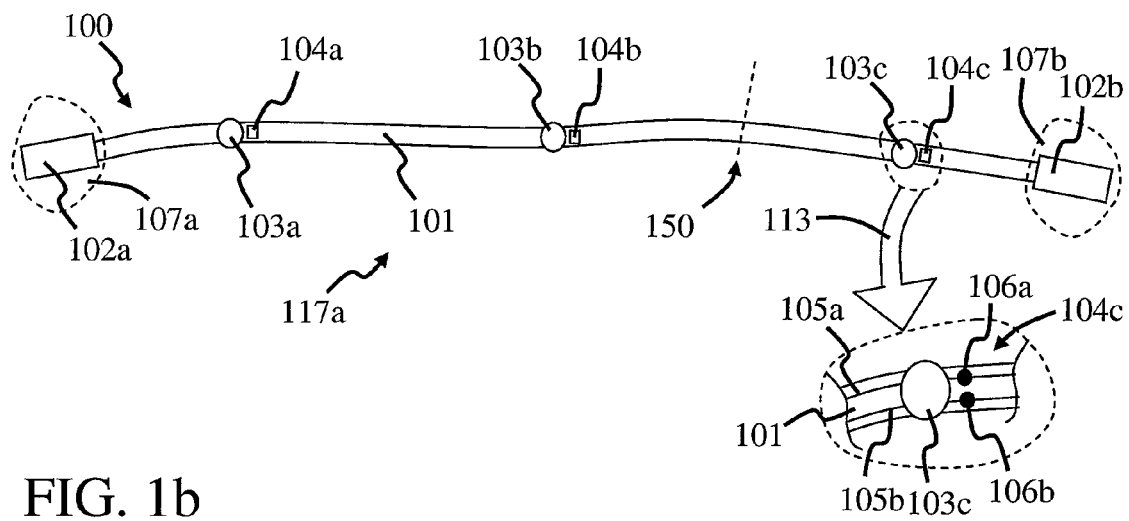
FIG. 1a is a top view of a networking cable with a lighting system, in accordance with the invention.
Figure 1B:
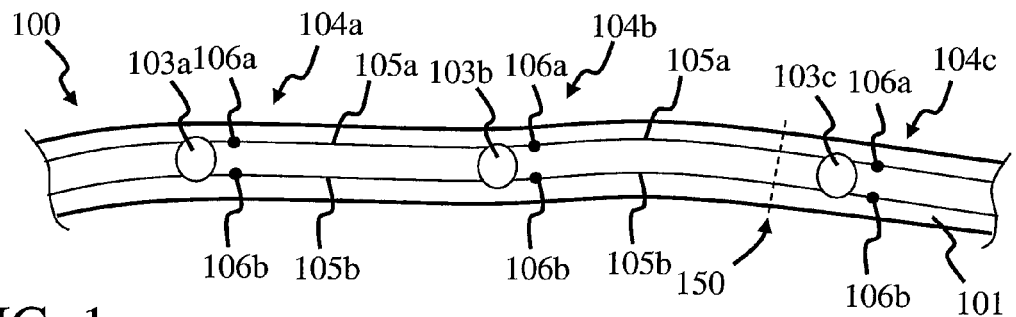

FIGS. 1a and 1b are top and perspective views, respectively, of a networking cable 100, in accordance with the invention. In this embodiment, networking cable 100 includes a waveguide 101 with cable connectors 102a and 102b at opposed ends. It should be noted that, in networking cables, cable connectors 102a and 102b are generally of the same type. For example, they are generally both male or both female, although one can be male and the other can be female in some embodiments.

The waveguide of a networking cable generally has characteristic impedance between about 50 ohms to 100 ohms, and allows the flow of one or more data signals therethrough. The data signals can be combined together and separated from each other. The data signals generally correspond to digital data which flows through the waveguide at data rates that are typically greater then one to two million bits per second (Mbps). For example, a typical computer network flows data at ten Mbps, although there are networks that flow data at rates of one hundred Mbps or more.

Waveguide 101 can be of many different types, such as a coaxial waveguide. A coaxial waveguide generally includes a conducting wire surrounded by a dielectric spacer, with the wire and spacer being surrounded by a conducting sheath. An outer insulating sheath is positioned on the outer periphery of the conducting sheath. Coaxial cables used in computer networking are sometimes referred to as "thinnet" and "thicknet".

However, in this embodiment, networking cable 100 is an Ethernet cable of the type generally used in Ethernet communication systems so that waveguide 101 is an Ethernet waveguide and cable connectors 102a and 102b are RJ-45 connectors. An Ethernet waveguide generally includes an outer insulating sheath positioned around separate conductive wires bundled together, with each wire having an insulative sheath. It should be noted, however, that the Ethernet waveguide can include fewer or more separate conductive wires.

Ethernet cables are typically categorized according to application and examples include CAT5 and CAT5e. These categories and others are outlined in standards, such as IEEE 802.3, IEEE 802.3a, etc., provided by the Institute of Electrical and Electronics Engineers (IEEE). Other standards are provided by the Electronic Industries Association (EIA).

In accordance with the invention, networking cable 100 includes a lighting system 117a carried by waveguide 101. As discussed in more detail below, lighting system 117a extends along the length of waveguide 101 and, in response to power provided thereto, provides an indication that cable connectors 102a and 102b are connected to opposed ends of waveguide 101. In response to power, lighting system 117a also illuminates along the length of waveguide 101. In this way, lighting system 117a is useful for tracing cable 100.

Lighting system 117a can include many different components. In this embodiment, lighting system 117a includes three light emitters, denoted as light emitters 103a, 103b and 103c, which are carried by waveguide 101. It should be noted that three light emitters are shown here for illustrative purposes, but cable 100 generally includes three or more light emitters spaced apart along the length of waveguide 101.

Light emitters 103a, 103b and 103c can be of many different types, such as light emitting diodes. The light emitting diodes can emit many different colors of light, such as visible light. However, it should be noted that they can emit infrared and/or ultraviolet light in some embodiments, and that the infrared and ultraviolet light can be detected by using an infrared and ultraviolet sensor, respectively.

In this embodiment, light emitters 103a, 103b and 103c are spaced apart from each other and positioned away from end regions 107a and 107b of waveguide 101. End regions 107a and 107b include cable connectors 102a and 102b, respectively, and corresponding adjacent portions of waveguide 101. The portions of waveguide 101 adjacent to cable connectors 102a and 102b are generally within one to two inches from cable connectors 102a and 102b, respectively, although other distances can be used. In this way, light emitters 103a, 103b and 103c are positioned away from cable connectors 102a and 102b.

It should be noted that light emitters 103a, 103b and 103c can be positioned away from each other by many different distances. Typical distances are between about one foot to four feet, although the distances can be outside of this range. In this way, if one light emitter fails to operate, the other light emitters can be used for tracing cable 100.

As best seen in FIG. 1b and by substitution arrow 113 of FIG. 1a, lighting system 117a includes conductive lines 105a and 105b connected to light emitters 103a, 103b and 103c so the light emitters are in communication with each other. In this embodiment, conductive lines 105a and 105b extend outside of waveguide 101. However, in other embodiments, conductive lines 105a and 105b can extend through waveguide 101. Conductive lines 105a and 105b are separate conductive lines in these embodiments, but they can be wrapped around each other in other examples. When conductive lines 105a and 105b are wrapped around each other, they are often referred to as a "twisted pair".

In this embodiment, lighting system 117a also includes light emitter connectors, denoted as connectors 104a, 104b and 104c, operatively coupled to light emitters 103a, 103b and 103c through conductive lines 105a and 105b. In lighting system 117a, the number of light emitter connectors is the same as the number of light emitters, although their number can be more or less in other embodiments. Light emitter connectors 104a, 104b and 104c are spaced apart from each other along the length of waveguide 101. In this way, lighting system 117a can be activated at different locations along the length of waveguide 101.

The light emitter connectors can be of many different types. As best seen in a perspective view of cable 100 shown in FIG. 1c, each of connectors 104a, 104b and 104c in this embodiment includes terminals 106a and 106b connected to and extending from conductive lines 105a and 105b, respectively. However, it should be noted that the light emitter connectors can be of many other types that allow a power source to provide a potential difference between conductive lines 105a and 105b. For example, as indicated by a substitution arrow 128, power connector 104b can be replaced with light emitter connector 104f, wherein light emitter connector 104f is substantially flat and conforms to the shape of waveguide 101. It should be noted that the other light emitter connectors in lighting system 117a can be replaced with light emitter connectors 104f, but this is not shown for simplicity.

Figure 1C:
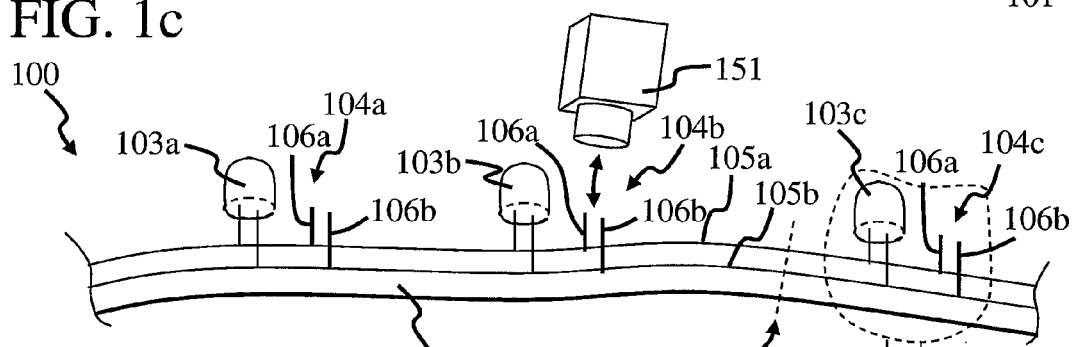

In operation, light emitters 103a, 103b and 103c are activated when a potential difference is provided to conductive lines 105a and 105b. When light emitters 103a, 103b and 103c are activated, they emit light and when they are deactivated, they do not emit light. The potential difference can be provided in many different ways, such as by flowing a power signal between terminals 106a and 106b of light emitter connectors 104a, 104b and/or 104c. In one embodiment, the power signal is provided by a power source 151 (FIGS. 1c and 8c). Power source 151 can include many different components, but it generally includes a power supply, such as a battery, operatively connected to a control circuit so it can be activated and deactivated.

Power source 151 is shaped and dimensioned to connect to light emitter connectors 104a, 104b and 104c so that when its power supply is activated, it flows the power signal which provides the potential difference to conductive lines 105a and 105b. When the battery is deactivated, it does not provide the power signal. In this way, power source 151 is used to activate and deactivate light emitters 103a, 103b and 103c. The activation of light emitters 103a, 103b and 103c indicates where waveguide 101 is located, which is useful when tracing cable 100.

Figure 1D:
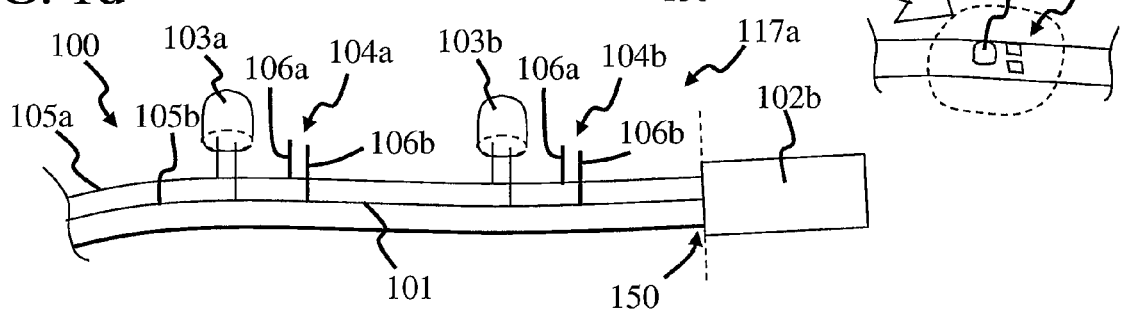
FIG. 1d is a perspective view of the networking cable of FIG. 1a with its length reduced.

In accordance with the invention, the length of cable 100 can be reduced while still retaining two or more light emitters along its length. For example, waveguide 101 can be cut at a line 150, as shown in FIGS. 1a, 1b and 1c, so that its length is reduced as shown in FIG. 1d. In FIG. 1d, light emitter 103c and light emitter connector 104c have been removed from waveguide 101 and cable connector 102b is affixed to the end opposed to cable connector 102a (FIG. 1a) at line 150. In this way, the length of cable 100 can be shortened to provide a desired length, while still allowing the operation of light emitters 103a and 103b and light emitter connectors 104a and 104b.

Hence, it is useful if a light emitter connector is positioned between adjacent light emitters so that the length of waveguide 101 can be reduced while still allowing the light emitters to be activated and deactivated. For example, light emitter connector 104a is positioned between light emitters 103a and 103b. Further, light emitter connector 104b is positioned between light emitters 103b and 103c. Light emitter connector 104c is positioned between light emitter 103c and cable connector 102b. In this way, the length of waveguide 101 can be reduce while still maintaining the operation of lighting system 117a.

FIGS. 2a and 2b are top and perspective views, respectively, of a cable 110, in accordance with the invention. In this embodiment, cable 110 includes waveguide 101 which carries a lighting system 117b and has cable connectors 102a and 102b at opposed ends 107a and 107b, respectively. Lighting system 117b can include many different components, but here it includes light emitters 103a, 103b and 103c, which are carried by waveguide 101 and positioned away from ends 107a and 107b.

In accordance with the invention, lighting system 117b also includes light emitter connectors 104d and 104e carried by waveguide 101 and positioned at ends 107a and 107b, respectively. In this way, light emitter connectors, each including a pair of terminals 106a and 106b, are positioned proximate to cable connectors 102a and 102b. In this embodiment, light emitter connector 104d is between cable connector 102a and light emitters 103a, 103b and 103c. Further, light emitter connector 104e is between cable connector 102b and light emitters 103a, 103b and 103c. In this way, a light emitter connector is positioned between a light emitter and cable connector. In lighting system 117b, the number of light emitter connectors is smaller than the number of light emitters. It should be noted, however, that the number of light emitter connectors can be greater than the number of light emitters. One such embodiment is discussed below with FIG. 2c.

As shown in FIG. 2b, lighting system 117b also includes conductive lines 105a and 105b which connect together light emitters 103a, 103b and 103c, as well as light emitter connectors 104d and 104e, as described in more detail above with FIG. 1c. In operation, light emitters 103a, 103b and 103c are activated when a potential difference is provided to conductive lines 105a and 105b. The potential difference can be provided in many different ways, such as by using power source 151 to flow a power signal between terminals 106a and 106b of light emitter connectors 104d and/or 104e. The activation of light emitters 103a, 103b and 103c indicates that waveguide 101 is connected to cable connectors 102a and 102b, which is useful when tracing cable 110.

FIG. 2c is a top view of a cable 112, in accordance with the invention. Cable 112 is similar to cable 110 of FIGS. 2a and 2b. In this embodiment, however, cable 112 includes lighting system 117c having light emitter connectors 104a, 104b and 104c positioned near light emitters 103a, 103b and 103c, respectively. In this way, a light emitter connector is positioned between adjacent light emitters. In lighting system 117c, the number of light emitter connectors is greater than the number of light emitters, although the number of light emitter connectors can be less, as in FIG. 2a, or the same, as in FIG. 1a, as the number of light emitters.

In accordance with the invention, the length of cables 110 and 112 can be reduced while still retaining two or more light emitters along its length. For example, cables 110 and 112 can be cut at line 150, as shown in FIGS. 2a and 2c, so their lengths are reduced as shown in FIGS. 2d and 2e, respectively. In FIG. 2d, light emitter 103c and light emitter connector 104e have been removed from waveguide 101 and lighting system 117b, and cable connector 102b has been affixed to the end opposed to cable connector 102a (FIGS. 2a and 2c) at line 150. In this way, the length of waveguide 101 can be shortened to provide a desired length, while still maintaining the operation of lighting system 117b. The operation of lighting system 117b is maintained because light emitters 103a and 103b are still included therein and still operate when the potential difference is provided between conductive lines 105a and 105b through light emitter connector 104d.

In FIG. 2e, light emitter 103c and light emitter connectors 104c and 104e have been removed from lighting system 117c and waveguide 101, and cable connector 102b has been affixed to the end opposed to cable connector 102a (FIG. 2c) at line 150. In this way, the length of cable 112 can be shortened to provide a desired length, while still allowing the operation of lighting system 117c. Lighting system 117c still operates because light emitters 103a and 103b operate when a potential difference is provided between conductive lines 105a and 105b through light emitter connector 104a, 104b and/or 104d.

FIG. 2f is a top view of a networking cable 160, in accordance with the invention, which includes waveguide 101 with cable connectors 102a and 102b at opposed ends. In this embodiment, cable 160 includes a lighting system 117d carried by waveguide 101. In accordance with the invention, lighting system 117d includes light emitter connector 104a and light emitter 103a positioned in end regions 107a and 107b, respectively. It should be noted that light emitter connector 104a and light emitter 103a are connected together through conductive lines 105a and 105b, as shown by arrow 113 in FIG. 1a, but this is not shown here for simplicity. In operation, the power signal is provided to light emitter connector 104a and light emitter 103a is activated in response. When the power signal is not provided to light emitter connector 104a, light emitter 103a is deactivated. In this way, lighting system 117d allows for the one-way tracing of cable 160.

Figure 3A:
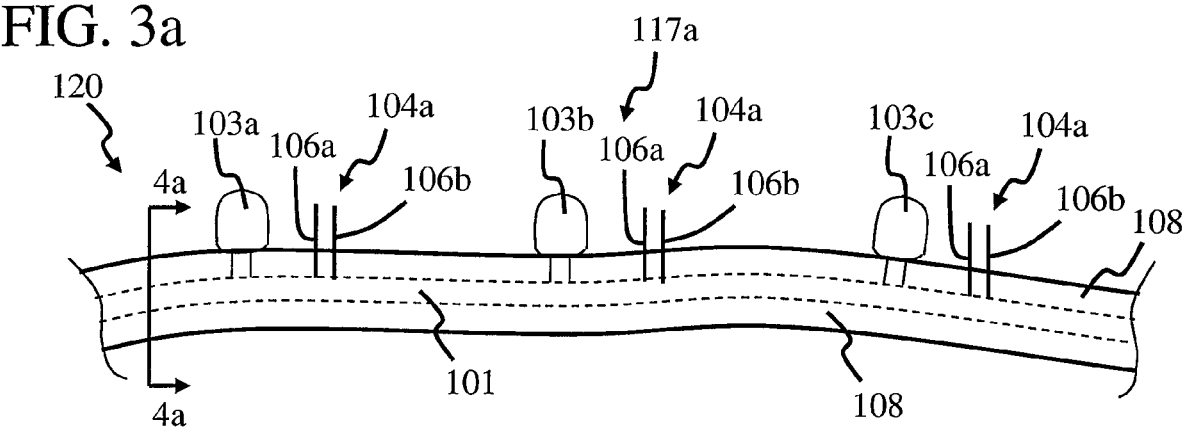
FIG. 3a is a side view of a networking cable, in accordance with the invention, having a lighting system with a support structure extending around the waveguide.

FIG. 3a is a side view of a cable 120, in accordance with the invention. In this embodiment, cable 120 includes waveguide 101 with a support structure 108 attached to it, wherein support structure 108 extends around the outer periphery of waveguide 101. This feature and others can also be seen in an end view of cable 120 shown in FIG. 4a taken along a cut-line 4a-4a of FIG. 3a. In this embodiment, support structure 108 is flexible so that structure 108 and waveguide 101 are flexible when attached together.

The flexibility of cable 120 is useful so that it can be stored and transported easier. For example, in some situations, cable 120 is wrapped around a spool during its manufacture. During installation, the spool allows cable 120 to be "pulled" in a controlled manner by unwrapping it from the spool. In other situations, cable 120 is wrapped around itself and stored in a box. This is often referred to as a "reel-in-a-box". These storage methods are useful because they allow cable 120 to be pulled easier while providing it with less twist.

A plurality of light emitters, denoted as light emitters 103a, 103b and 103c, are carried by support structure 108 and spaced apart from each other along its length. Light emitters 103a, 103b and 103c are positioned on the outer periphery of support structure 108, although they can extend through support structure 108 in other embodiments. One such embodiment where light emitters extend through a support structure is discussed below with FIGS. 3b and 4b. Support structure 108 attaches light emitters 103a, 103b and 103c to waveguide 101 and conductive lines 105a and 105b connect light emitters 103a, 103b and 103c together, as described above.

Conductive lines 105a and 105b and light emitters 103a, 103b and 103c can be positioned at many different locations. In cable 120, conductive lines 105a and 105b are positioned between waveguide 101 and support structure 108 so they extend outside of waveguide 101. It should be noted, however, that conductive lines 105a and 105b can be positioned so they extend through other locations. For example, conductive lines can extend through support structure 108, as discussed below with FIG. 4d. In another example, conductive lines extend along the outer periphery of a support structure, as discussed below with FIG. 4e.

Figure 3B:
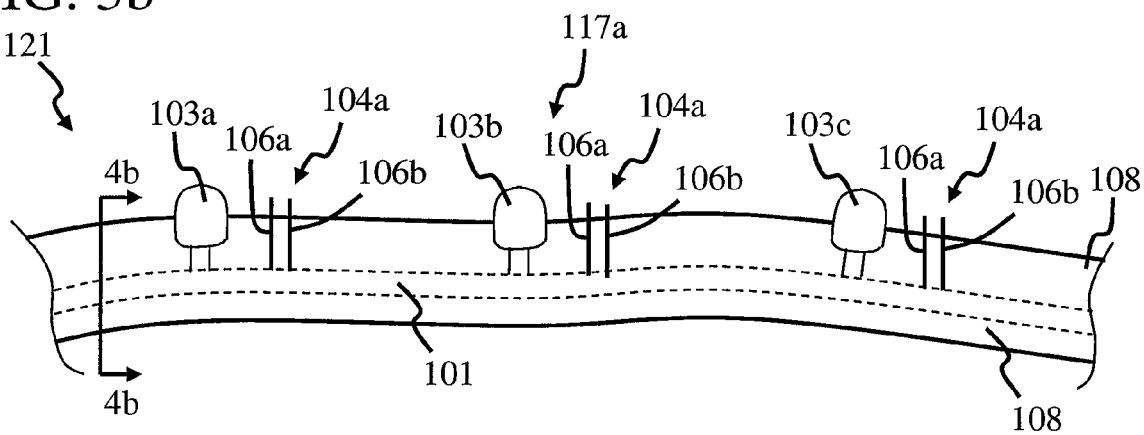
FIG. 3b is a side view of a networking cable, in accordance with the invention, wherein the light emitters extend through the support structure.

FIG. 3b is a side view of a cable 121, in accordance with the invention, which is similar to cable 120. In this embodiment, however, light emitters 103a, 103b and 103c extend through support structure 108 and conductive lines 105a and 105b extend between support structure 108 and waveguide 101. This is best seen in an end view of cable 121 shown in FIG. 4b taken along a cut-line 4b-4b of FIG. 3b.

Figure 3C:
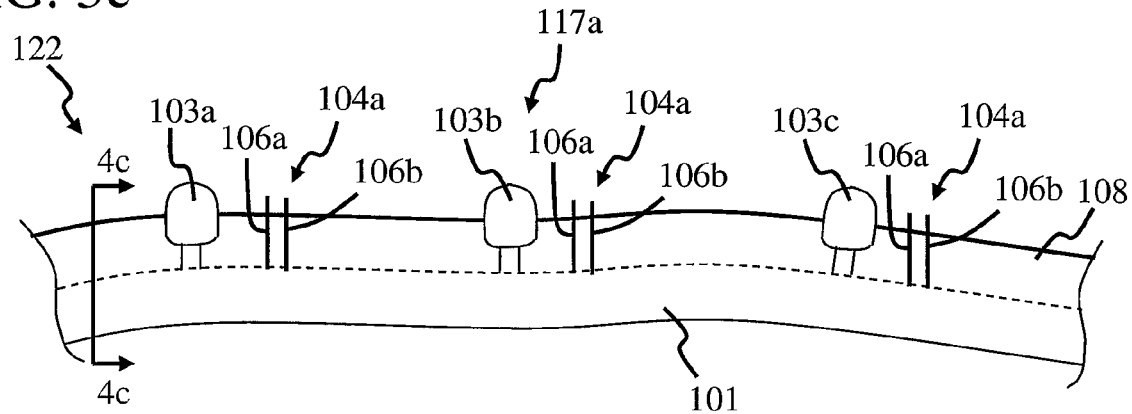
FIG. 3c is a side view of a networking cable, in accordance with the invention, wherein the support structure partially extends around the waveguide.

FIG. 3c is a side view of a cable 122, in accordance with the invention, which is similar to cable 120. In this embodiment, however, support structure 108 extends partially around the outer periphery of waveguide 101. This is best seen in an end view of cable 122 shown in FIG. 4c taken along a cut-line 4c-4c of FIG. 3c. Here, light emitters 103a, 103b and 103c extend through support structure 108 and conductive lines 105a and 105b extend between waveguide 101 and support structure 108. It should be noted that cables 120, 121 and 122 include lighting system 117a for illustrative purposes, but they can include lighting systems 117b, 117c and 117d in other embodiments.

FIGS. 4d and 4e are end views of cables 123 and 124, respectively. Conductive lines 105a and 105b in cable 123 extend through support structure 108 so that structure 108 protects them. Conductive lines 105a and 105b in cable 124 extend on the outer periphery of support structure 108 so that a potential difference can be established between them along their length. It should be noted that light emitter 103a can engage support structure 108, as in FIGS. 4a, 4b and 4c, or it can be spaced apart from it, as in FIGS. 4d and 4e. Light emitter 103a is engaged with support structure 108 in cables 120 and 121 so that its connection to conductive lines 105a and 105b is better protected. Further, light emitter 103a is less likely to be bent, as in a direction 159 (FIG. 4a). Light emitter 103a in cables 123 and 124 is spaced apart from support structure 108 so that it emits lights in more directions when activated, which makes it easier to see.

Figure 5A:
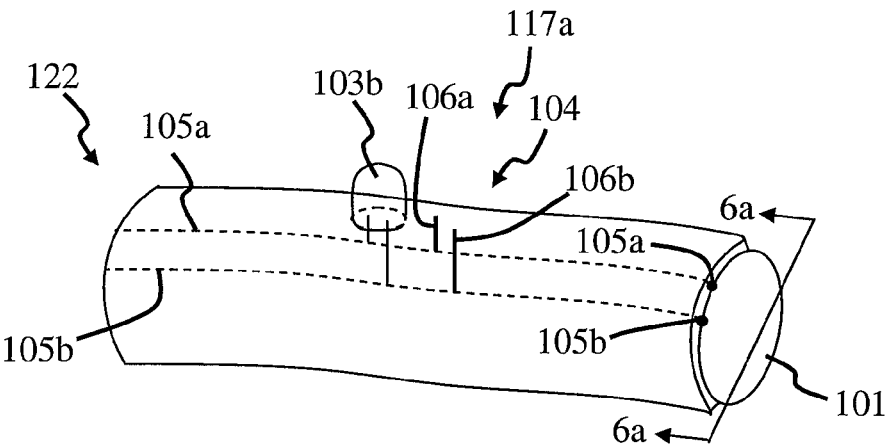
FIGS. 5a and 5b are perspective views of the cable of FIG. 3c with the support structure in attached and detached positions, respectively.
Figure 5B:
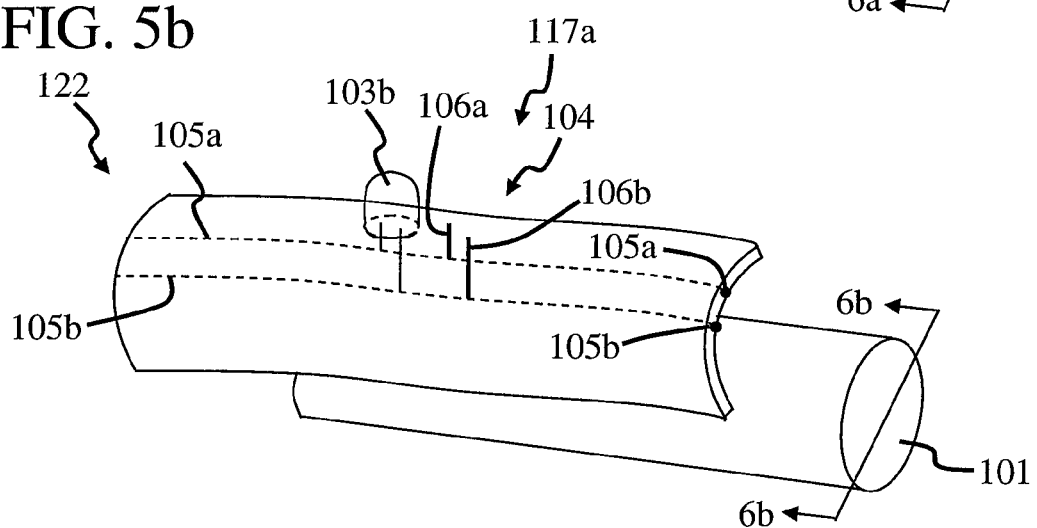

FIGS. 5a and 5b are perspective views of cable 122 with support structure 108 in attached and detached positions, respectively. In accordance with the invention, support structure 108 is repeatably moveable between the attached and detached positions relative to waveguide 101. Since support structure 108 carries lighting system 117a, lighting system 117a is also repeatably moveable between the attached and detached positions relative to waveguide 101.

Figure 6A:
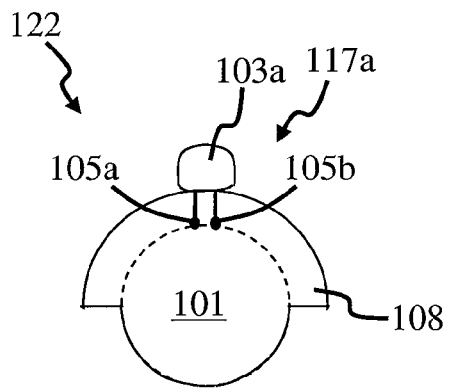
Figure 6B:
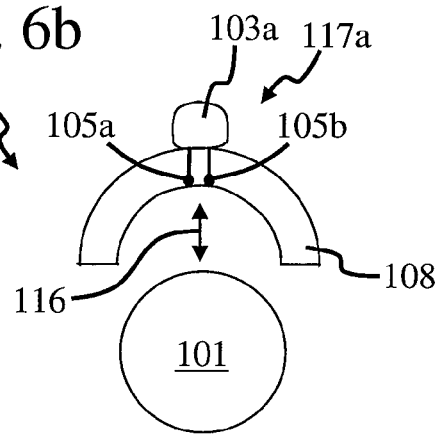
FIG. 6b is an end view of the cable of FIG. 5b taken along a cut-line 6b-6b.

Support structure 108 can be attached to waveguide 101 in many different ways, such as with an adhesive. The attachment of support structure 108 to waveguide 101 is shown in an end view of cable 122 shown in FIG. 6a taken along a cut-line 6a-6a of FIG. 5a. The detachment of support structure 108 from waveguide 101 is shown in an end view of cable 122 taken along a cut-line 6b-6b shown in FIG. 6b. The movement of support structure 108 to and away from waveguide 101 is indicated by a movement arrow 116 in FIG. 6b. In this way, lighting system 117a is repeatably moveable between attached and detached positions relative to waveguide 101. It should be noted that when support structure 108 and lighting system 117a are detached from waveguide 101, lighting system 117a still operates.

Figure 7A:
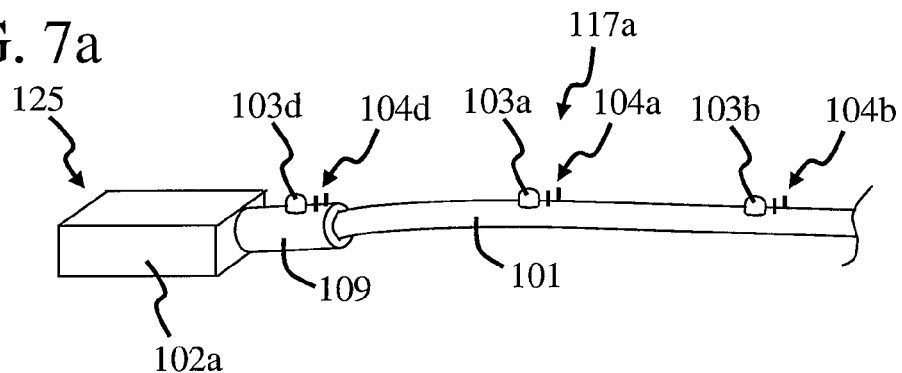
FIGS. 7a and 7b are perspective views of different embodiments of a networking cable with an insulative sleeve, in accordance with the invention.

FIG. 7a is a perspective view of a cable 125, in accordance with the invention. In this embodiment, cable 125 includes an insulative housing 109 carried by waveguide 101. Insulative housing 109 can be permanently attached to waveguide 101 or it can be attached to it in a repeatably removeable manner. Here, insulative housing 109 is positioned adjacent to cable connector 102a, although it can be positioned away from connector 102a in other embodiments. It should be noted that cable 125 can include another insulative housing adjacent to a cable connector at the opposed end of waveguide 101, but this is not shown here for simplicity.

In accordance with the invention, cable 125 includes lighting system 117a carried by waveguide 101, wherein lighting system 117a further includes a light emitter 103d and light emitter connector 104d extending through insulative housing 109. In this way, insulative housing 109 houses a light emitter and light emitter connector. It should be noted that in some embodiments, light emitter 103d can be covered by insulative housing 109 so that emitter 103d emits light through housing 109. However, in this embodiment, light emitter 103d extends outside of insulative housing 109. Insulative housing 109 can include many different materials, but here it includes clear insulative material, such as rubber and plastic. The material is clear with respect to the wavelengths of light emitted by light emitter 103d. Insulative housing 109 can be colored in some embodiments so that it lights up when light emitter 103d is activated.

Figure 7B:
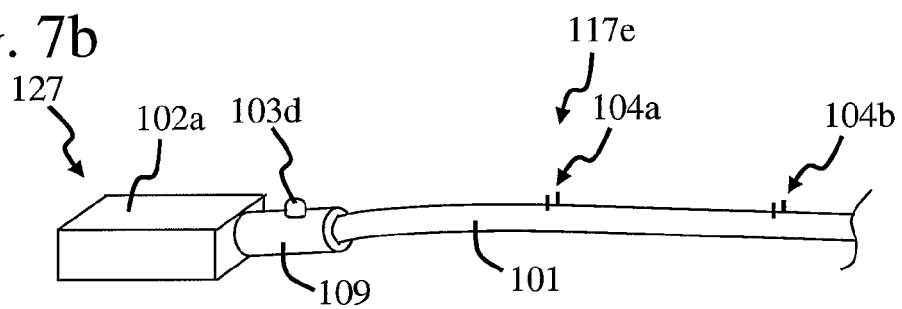

FIG. 7b is a perspective view of a cable 127, in accordance with the invention. In this embodiment, cable 127 includes insulative housing 109 carried by waveguide 101 and positioned adjacent to cable connector 102a, as describe above with cable 125. Cable 127 includes a lighting system 117e carried by waveguide 101, wherein lighting system 117e includes light emitter connectors 104a and 104b positioned along the length of waveguide 101 and spaced apart from cable connector 102a and insulative housing 109. In this embodiment, lighting system 117e does not include light emitters positioned along the length of waveguide 101. In accordance with the invention, lighting system 117e further includes light emitter 103d extending through insulative housing 109, and does not include a light emitter connector extending through housing 109. In this way, insulative housing 109 houses a light emitter and does not house a light emitter connector.

Figure 7C:
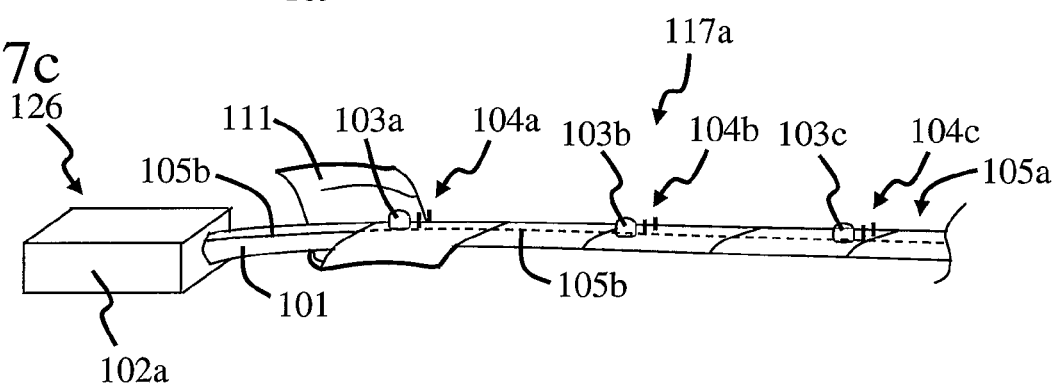
FIG. 7c is a perspective view of a networking cable with a lighting system attached to a waveguide with an adhesive piece, in accordance with the invention.

FIG. 7c is a perspective view of a cable 126, in accordance with the invention. In this embodiment, cable 126 includes lighting system 117a carried by waveguide 101. In accordance with the invention, lighting system 117a is attached to waveguide 101 with an adhesive piece 111. Adhesive piece 111 is wrapped around waveguide 101 and holds lighting system 117a to it. In this way, an existing cable can be modified to carry a lighting system for cable tracing by taping it to the waveguide. It should be noted that lighting system 117a can be removed from waveguide 101 by unwrapping adhesive piece 117a from waveguide 101. As mentioned above, when lighting system 117a is removed from waveguide 101, it still operates.

It should also be noted that adhesive piece 111 is generally tape. Examples of tape include electrical and duct tape, and are made by many different manufacturers, such as 3M Corporation. In some embodiments, adhesive piece 111 can be replaced with a shrink-wrap material, such as plastic, which conforms to the shape of waveguide 101 when heated and holds lighting system 117a thereto.

Figure 7D:
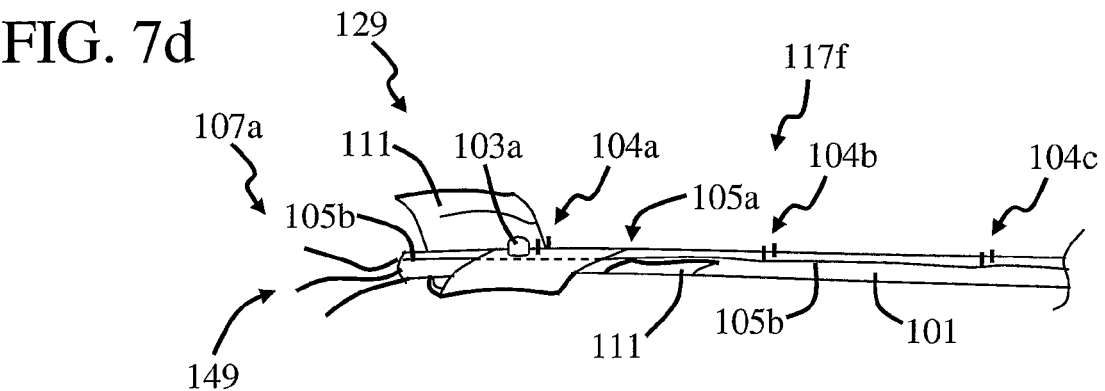
FIG. 7d is a perspective view of a cable with a lighting system attached to a waveguide with an adhesive piece, wherein the waveguide is embodied as an Ethernet waveguide.

FIG. 7d is a perspective view of a cable 129, in accordance with the invention. In this embodiment, cable 129 includes a lighting system 117f carried by waveguide 101, wherein lighting system 117f includes light emitter 103a coupled with light emitter connectors 104a, 104b and 104c. Light emitter connectors 104a-104c are positioned along the length of waveguide 101 and connected to light emitter 103a with conductive lines 105a and 105b. Light emitter 103a and light emitter connector 104a are positioned near end region 107a.

In accordance with the invention, adhesive piece 111 is used to adhere light emitter 103a to waveguide 101. Adhesive piece 111 also adheres the portion of conductive lines 105a and 105b near light emitter 103a to waveguide 101. It should be noted that, in FIG. 7d, cable connector 102a is disconnected from end region 107a of waveguide 101. In this embodiment, cable 129 is an Ethernet cable so that waveguide 101 includes a plurality of wires, denoted as wires 149. A typical Ethernet cable includes eight wires, but only three are shown here for simplicity.

Figure 8A:
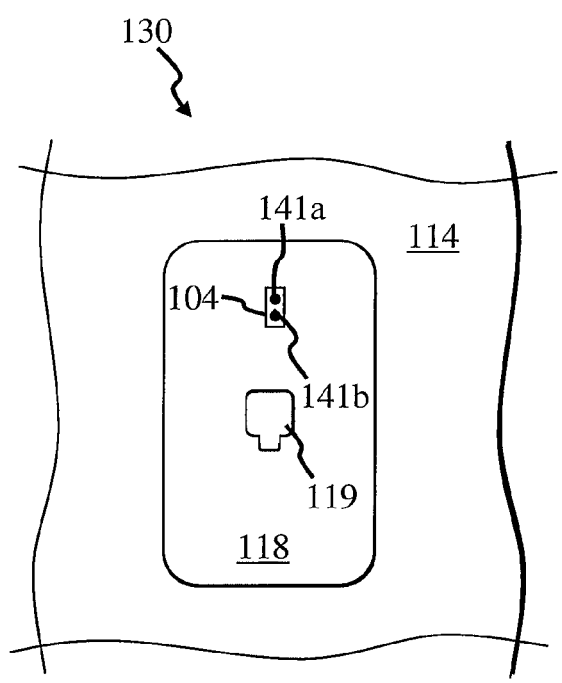
FIGS. 8a and 8b are front views of a connection system, in accordance with the invention, having a light emitter connector extending through a faceplate and wall, respectively.
Figure 8B:
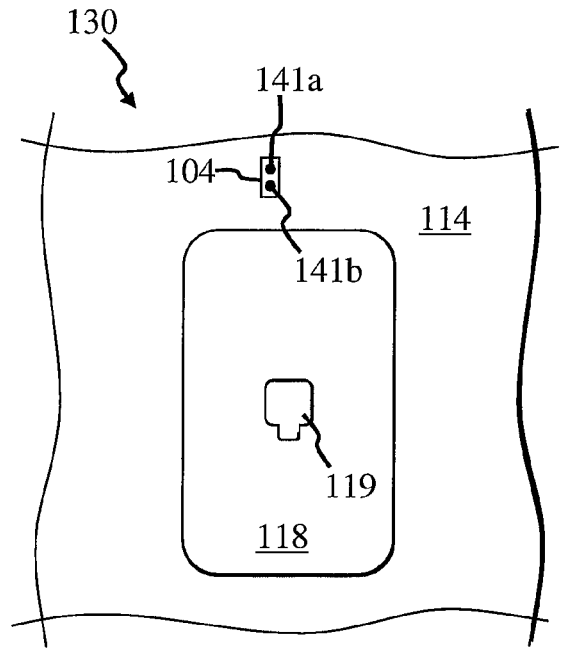

FIGS. 8a and 8b are front views of a connection system 130, in accordance with the invention. In this embodiment, connection system 130 includes a faceplate 118 attached to a wall 114. Face plate 118 includes a faceplate connector 119 shaped and dimensioned to receive a cable connector, such as cable connectors 102a and 102b. In this particular example, faceplate connector 119 is for an Ethernet connection so that cable connectors 102a and 102b are RJ-45 connectors.

In accordance with the invention, connection system 130 includes a light emitter connector 104, which has terminals 141a and 141b. Light emitter connector 104 has the same structure as the other light emitter connectors, such as light emitter connectors 104a, 104b and 104c, discussed above. Further, terminals 141a and 141b correspond to terminals 106a and 106b, respectively. It should be noted that light emitter connector 104 can be positioned at many different locations in system 130. For example, faceplate 118 can be modified, as shown in FIG. 8a, so that light emitter connector 104 extends through it. In another example, light emitter connector 104 extends through wall 114, as shown in FIG. 8b, so that faceplate 118 is not modified.

FIG. 8c is a side view of connection system 130. In this embodiment, connection system 130 includes a cable 115 with waveguide 101 carrying lighting system 117a. Here, lighting system 117a includes light emitters 103a, 103b, 103c and 103d, as well as light emitter connectors 104a, 104b, 104c and 104d. Waveguide 101 is an Ethernet cable so it includes wires 149, as described with FIG. 7d. Wires 149 at end region 107b are connected to faceplate connector 119 at the side of wall 114 opposed to faceplate 118. Faceplate connector 119 is shaped and dimensioned to receive a cable connector 102c, which is connected to a waveguide 134. It should be noted that cable connector 102d is the same as the cable connectors discussed above.

In this embodiment, connection system 130 also includes a patch panel 131 having a faceplate 132 with a plurality of connection ports 133 extending therethrough. Wires 149 at end 107a of waveguide 101 are connected to one of the connection ports 133 so that signals can flow between connection ports 119 and 133 through cable 115. There are several different types of patch panels which can be used, such as the Catalyst Inline Power Patch Panel made by Cisco Systems. Connection ports 133 are dimensioned and shaped to receive cable connector 102a and are generally of the same type as connection port 119.

In accordance with the invention, light emitter connector 104 is connected to light emitter connector 104d so power signals can flow between them. Connectors 104 and 104d can be connected together in many different ways. In this embodiment, a conductive line 138 is connected between conductive contact 106a and conductive contact 141a and a conductive line 139 is connected between conductive contact 106b and conductive contact 141b. These connections can be made in many different ways, such as with soldering.

In another embodiment, as indicated by substitution arrow 136, conductive lines 138 and 139 are connected to a connector 135 at ends opposed to conductive contacts 141a and 141b. Connector 135 is connected to light emitter connector 104d in a repeatably removeable manner, although in other embodiments, it can be permanently attached thereto. As discussed with FIG. 8b, light emitter connector 104 can be positioned on wall 114 instead of faceplate 118. This embodiment is indicated in FIG. 8c with substitution arrow 137.

The power signal to activate light emitters 103a, 103b, 103c and 103d is provided by power source 151. Power source 151 is shaped and dimensioned to connect to light emitter connector 104. It should be noted that power source 151 can also be shaped and dimensioned to connect to light emitters 104a, 104b and 104c, as discussed in more detail above. In this way, lighting system 117a is used to trace waveguide 101 between faceplate 118 and patch panel 131.

The embodiments of the invention described herein are exemplary and numerous modifications, variations and rearrangements can be readily envisioned to achieve substantially equivalent results, all of which are intended to be embraced within the spirit and scope of the invention.

The invention claimed is:

1. A networking cable, comprising:
    a waveguide with cable connectors connected proximate to opposed ends; and
    a lighting system carried by the waveguide, the lighting system including three or more light emitters connected together with conductive lines;
    wherein at least one of the light emitters is spaced from the cable connectors, and
    wherein the conductive lines are external to the waveguide.

2. The cable of claim 1, wherein at least one of the light emitters is positioned between the other light emitters.

3. The cable of claim 1, wherein the lighting system includes at least one light emitter connector operatively coupled with the light emitters.

4. The cable of claim 3, wherein the number of light emitter connectors is greater or less than the number of light emitters.

5. The cable of claim 1, further including a light emitter connector positioned between one of the cable connectors and the light emitters.

6. The cable of claim 1, further including a light emitter connector positioned between adjacent light emitters.

7. The cable of claim 1, wherein the conductive lines are attached to the waveguide-with an adhesive piece.

8. A networking cable, comprising:
a waveguide which includes an outer insulative sheath; and
a lighting system having a plurality of light emitters, the lighting system being carried by the outer insulative sheath and repeatably removeable therefrom;
wherein the lighting system operates when it is attached to and detached from the outer insulative sheath.

9. The cable of claim 1, wherein the lighting system operates when it is attached to and detached from the waveguide.

10. The cable of claim 8, wherein at least one of the light emitters is positioned away from opposing ends of the waveguide.

11. The cable of claim 8, wherein the lighting system includes a flexible support structure which carries the light emitters, wherein the flexible support structure is positioned on the outside of the outer insulative sheath.

12. The cable of claim 11, wherein the light emitters extend through the support structure.

13. The cable of claim 11, further including conductive lines carried by the support structure, the conductive lines connecting the light emitters together.

14. The cable of claim 13, further including a light emitter connector connected to the conductive lines.

15. A networking cable, comprising:
a waveguide having a characteristic impedance between about 50 ohms and about 100 ohms, and an outer insulative sheath; and
a lighting system carried by the outer insulative sheath, the lighting system including a plurality of light emitters;
wherein at least one of the light emitters is spaced from an end of the waveguide;
wherein the lighting system operates when it is attached to and detached from the outer insulative sheath.

16. The cable of claim 15, wherein the lighting system further includes a support structure which carries the light emitters.

17. The cable of claim 15, wherein the lighting system is positioned outside the outer insulative sheath and is repeatably removeable therefrom.

18. The cable of claim 15, wherein the lighting system further includes conductive lines which connect the light emitters together, wherein the conductive lines are positioned outside of the outer insulative sheath.

19. The cable of claim 15, wherein the lighting system further includes one or more light emitter connectors operatively coupled with the light emitters.

20. The cable of claim 19, wherein the number of light emitter connectors is greater or less than the number of light emitters.

* * * * *